US010393009B2

(12) United States Patent
Mohtar et al.

(10) Patent No.: US 10,393,009 B2
(45) Date of Patent: Aug. 27, 2019

(54) ADJUSTABLE-TRIM CENTRIFUGAL COMPRESSOR FOR A TURBOCHARGER

(71) Applicant: Honeywell International Inc., Morris Plains, NJ (US)

(72) Inventors: Hani Mohtar, Chaumousey (FR); Pascal Villemin, Girancourt (FR); Alain Lombard, Vosges (FR); Stephane Pees, Ceintrey (FR); Stephane Doise, Epinal (FR)

(73) Assignee: Garrett Transportation I Inc., Torrance, CA (US)

( * ) Notice: Subject to any disclaimer, the term of this patent is extended or adjusted under 35 U.S.C. 154(b) by 352 days.

(21) Appl. No.: 15/446,090

(22) Filed: Mar. 1, 2017

(65) Prior Publication Data

US 2017/0298943 A1    Oct. 19, 2017

Related U.S. Application Data

(60) Provisional application No. 62/324,488, filed on Apr. 19, 2016.

(51) Int. Cl.
*F02B 37/22* (2006.01)
*F04D 29/46* (2006.01)
(Continued)

(52) U.S. Cl.
CPC ........ *F02B 37/225* (2013.01); *F04D 27/0246* (2013.01); *F04D 29/4213* (2013.01);
(Continued)

(58) Field of Classification Search
USPC .......................................................... 415/160
See application file for complete search history.

(56) References Cited

U.S. PATENT DOCUMENTS

| | | | | | |
|---|---|---|---|---|---|
| 908,227 | A | * | 12/1908 | Elling | F04D 27/002 415/146 |
| 2,083,447 | A | * | 6/1937 | Hoffmann | F04D 29/464 138/39 |

(Continued)

FOREIGN PATENT DOCUMENTS

| | | |
|---|---|---|
| DE | 102010026176 A1 | 1/2012 |
| DE | 102011121996 B4 | 6/2013 |

(Continued)

*Primary Examiner* — Jason D Shanske
*Assistant Examiner* — Brian Christopher Delrue
(74) *Attorney, Agent, or Firm* — John C. James

(57) ABSTRACT

A centrifugal compressor for a turbocharger includes an inlet-adjustment mechanism in an air inlet for the compressor, operable to move between an open position and a closed position in the air inlet. The inlet-adjustment mechanism includes a plurality of first blades disposed about the air inlet and each pivotable about one end of the blade, and a plurality of second blades axially adjacent to the first blades and disposed about the air inlet and each pivotable about one end of the blade, the first and second blades extending through a slot in the air inlet wall when the blades are in the closed position so as to form an orifice of reduced diameter relative to a nominal diameter of the inlet. Movement of the inlet-adjustment mechanism from the open position to the closed position is effective to shift the compressor's surge line to lower flow rates.

9 Claims, 7 Drawing Sheets

(51) Int. Cl.
*F04D 27/02* (2006.01)
*F04D 29/42* (2006.01)
(52) U.S. Cl.
CPC ........ *F04D 29/464* (2013.01); *F05D 2220/40* (2013.01); *Y02T 10/144* (2013.01)

(56) References Cited

U.S. PATENT DOCUMENTS

| | | | | |
|---|---|---|---|---|
| 4,122,668 A * | 10/1978 | Chou | ................... | F01D 21/006 188/290 |
| 4,460,310 A * | 7/1984 | Plunkett | ................ | F01D 17/143 415/158 |
| 4,769,994 A * | 9/1988 | Hirabayashi | .......... | F01D 17/146 60/602 |
| 4,969,798 A * | 11/1990 | Sakai | ................. | F04D 27/0246 415/150 |
| 5,683,223 A * | 11/1997 | Harada | ................... | F04D 27/02 415/17 |
| 8,806,867 B2 * | 8/2014 | Hayashi | ................ | F01D 17/165 415/160 |
| 9,777,737 B2 * | 10/2017 | Houst | ..................... | F02B 37/22 |
| 9,790,949 B2 * | 10/2017 | Tashiro | ................... | F02B 37/24 |
| 2004/0096316 A1 * | 5/2004 | Simon | ................ | F01D 17/141 415/151 |
| 2006/0037316 A1 * | 2/2006 | Richey | ................... | F01D 17/00 60/601 |
| 2006/0117749 A1 * | 6/2006 | Sumser | ................ | F01D 17/141 60/599 |
| 2007/0144172 A1 * | 6/2007 | Sumser | ................ | F02B 37/013 60/602 |
| 2008/0035112 A1 * | 2/2008 | Yamaguchi | ............. | F02B 37/12 123/436 |
| 2008/0276613 A1 * | 11/2008 | Noelle | ................ | F01D 17/165 60/595 |
| 2009/0077966 A1 * | 3/2009 | Lombard | .............. | F01D 17/143 60/602 |
| 2009/0095350 A1 * | 4/2009 | Bauman | ................... | F16K 3/03 137/1 |
| 2009/0120087 A1 * | 5/2009 | Sumser | ................ | F01N 13/107 60/600 |
| 2009/0301082 A1 * | 12/2009 | Lombard | .............. | F01D 17/143 60/602 |
| 2010/0124489 A1 * | 5/2010 | Suzuki | ................ | F01D 17/165 415/150 |
| 2011/0243721 A1 * | 10/2011 | Alajbegovic | ......... | F01D 17/165 415/204 |
| 2011/0296829 A1 * | 12/2011 | Hayashi | ................ | F01D 17/165 60/602 |
| 2012/0031377 A1 * | 2/2012 | Okada | ................. | F02D 13/0226 123/480 |
| 2012/0099964 A1 * | 4/2012 | Wang | ...................... | F01D 9/026 415/144 |
| 2013/0294895 A1 * | 11/2013 | Yokoyanna | ........... | F01D 17/165 415/159 |
| 2014/0056697 A1 * | 2/2014 | Fournier | ................ | F04D 29/466 415/148 |
| 2014/0161595 A1 * | 6/2014 | Tashiro | .................. | F02B 37/24 415/146 |
| 2014/0308110 A1 * | 10/2014 | Houst | ..................... | F02B 37/22 415/1 |
| 2014/0356138 A1 * | 12/2014 | Sun | ....................... | F04D 29/464 415/148 |
| 2015/0041695 A1 * | 2/2015 | Daniels | ..................... | F16K 3/03 251/212 |
| 2015/0118038 A1 * | 4/2015 | Ward | .................... | F01D 17/165 415/208.2 |
| 2015/0122233 A1 * | 5/2015 | Iizuka | ..................... | F02B 37/24 123/561 |
| 2015/0132112 A1 * | 5/2015 | Metz | ..................... | F01D 17/165 415/159 |
| 2015/0211538 A1 * | 7/2015 | Aiba | ..................... | F01D 17/165 415/146 |
| 2015/0219110 A1 * | 8/2015 | De | ....................... | F04D 27/0246 415/1 |
| 2016/0237910 A1 * | 8/2016 | Saito | ................... | F04D 27/0246 |
| 2016/0305274 A1 * | 10/2016 | Kennedy | ................ | F02B 37/24 |
| 2016/0326951 A1 * | 11/2016 | Groves | ................. | F02B 37/24 |
| 2017/0022891 A1 * | 1/2017 | Arai | ................... | B23K 15/0053 |
| 2017/0044925 A1 * | 2/2017 | Myers | .................. | F01D 17/143 |
| 2017/0044927 A1 * | 2/2017 | Morgan | ................ | F01D 11/122 |
| 2017/0211707 A1 * | 7/2017 | Wakayama | ............. | F02D 9/02 |
| 2017/0298953 A1 * | 10/2017 | Lombard | ................ | F02B 37/00 |
| 2017/0343002 A1 * | 11/2017 | Ottow | .................. | F04D 29/162 |
| 2018/0163735 A1 * | 6/2018 | Kim | ...................... | F04D 27/002 |
| 2019/0048876 A1 * | 2/2019 | Mohtar | ................ | F04D 29/4226 |

FOREIGN PATENT DOCUMENTS

| | | | |
|---|---|---|---|
| DE | 102013003418 A1 | 8/2014 | |
| WO | 2013074503 A1 | 5/2013 | |
| WO | WO-2016041024 A2 * | 3/2016 | ............ F04C 29/124 |

* cited by examiner

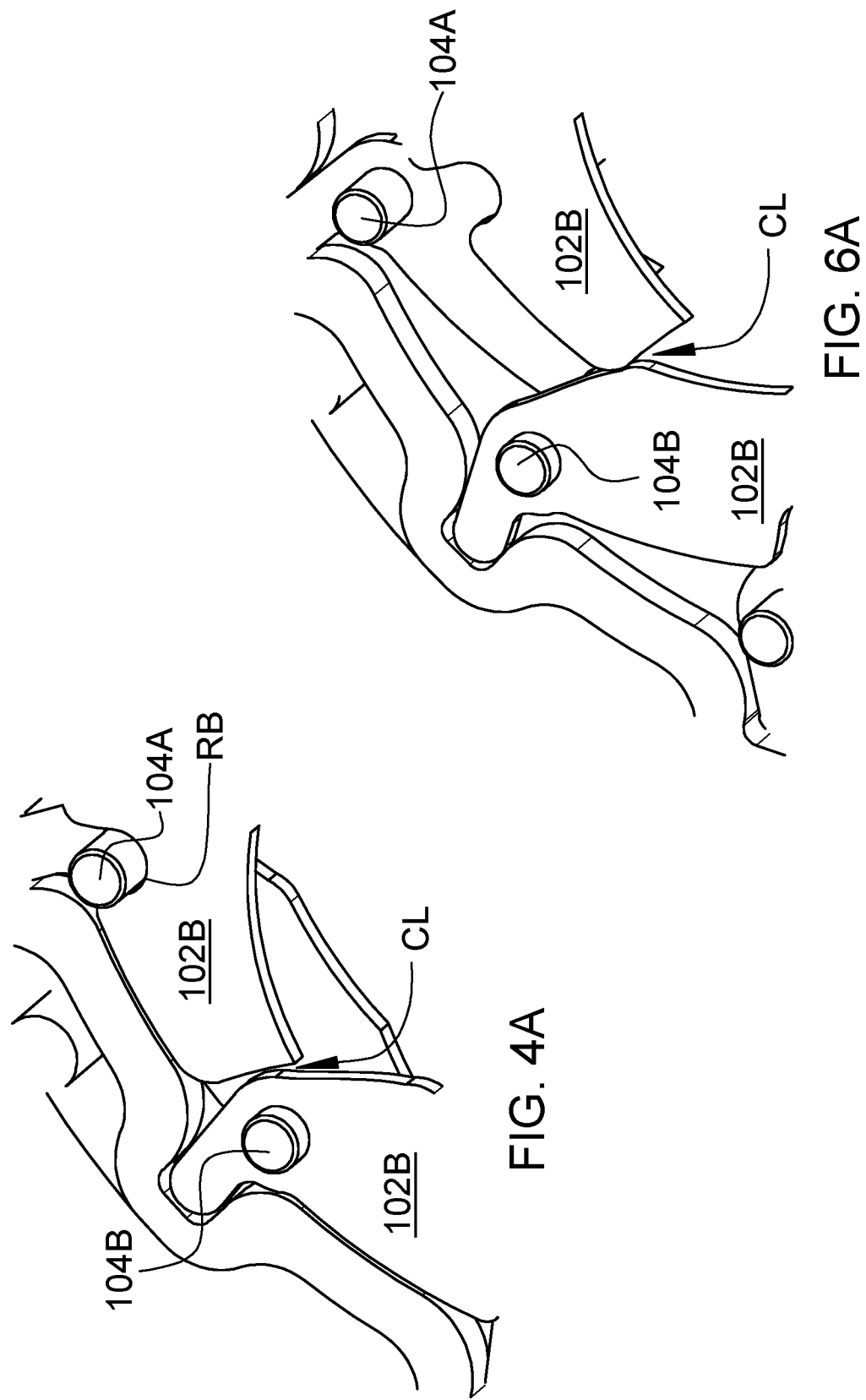

ADJUSTABLE-TRIM CENTRIFUGAL COMPRESSOR FOR A TURBOCHARGER

BACKGROUND OF THE INVENTION

The present disclosure relates to centrifugal compressors, such as used in turbochargers, and more particularly relates to centrifugal compressors in which the effective inlet area or diameter can be adjusted for different operating conditions.

An exhaust gas-driven turbocharger is a device used in conjunction with an internal combustion engine for increasing the power output of the engine by compressing the air that is delivered to the air intake of the engine to be mixed with fuel and burned in the engine. A turbocharger comprises a compressor wheel mounted on one end of a shaft in a compressor housing and a turbine wheel mounted on the other end of the shaft in a turbine housing. Typically the turbine housing is formed separately from the compressor housing, and there is yet another center housing connected between the turbine and compressor housings for containing bearings for the shaft. The turbine housing defines a generally annular chamber that surrounds the turbine wheel and that receives exhaust gas from an engine. The turbine assembly includes a nozzle that leads from the chamber into the turbine wheel. The exhaust gas flows from the chamber through the nozzle to the turbine wheel and the turbine wheel is driven by the exhaust gas. The turbine thus extracts power from the exhaust gas and drives the compressor. The compressor receives ambient air through an inlet of the compressor housing and the air is compressed by the compressor wheel and is then discharged from the housing to the engine air intake.

Turbochargers typically employ a compressor wheel of the centrifugal (also known as "radial") type because centrifugal compressors can achieve relatively high pressure ratios in a compact arrangement. Intake air for the compressor is received in a generally axial direction at an inducer portion of the centrifugal compressor wheel and is discharged in a generally radial direction at an exducer portion of the wheel. The compressed air from the wheel is delivered to a volute, and from the volute the air is supplied to the intake of an internal combustion engine.

The operating range of the compressor is an important aspect of the overall performance of the turbocharger. The operating range is generally delimited by a surge line and a choke line on an operating map for the compressor. The compressor map is typically presented as pressure ratio (discharge pressure Pout divided by inlet pressure Pin) on the vertical axis, versus corrected mass flow rate on the horizontal axis. The choke line on the compressor map is located at high flow rates and represents the locus of maximum mass-flow-rate points over a range of pressure ratios; that is, for a given point on the choke line, it is not possible to increase the flow rate while maintaining the same pressure ratio because a choked-flow condition occurs in the compressor.

The surge line is located at low flow rates and represents the locus of minimum mass-flow-rate points without surge, over a range of pressure ratios; that is, for a given point on the surge line, reducing the flow rate without changing the pressure ratio, or increasing the pressure ratio without changing the flow rate, would lead to surge occurring. Surge is a flow instability that typically occurs when the compressor blade incidence angles become so large that substantial flow separation arises on the compressor blades. Pressure fluctuation and flow reversal can happen during surge.

In a turbocharger for an internal combustion engine, compressor surge may occur when the engine is operating at high load or torque and low engine speed, or when the engine is operating at a low speed and there is a high level of exhaust gas recirculation (EGR). Surge can also arise when an engine is suddenly decelerated from a high-speed condition. Expanding the surge-free operation range of a compressor to lower flow rates is a goal often sought in compressor design.

BRIEF SUMMARY OF THE DISCLOSURE

The present disclosure describes mechanisms and methods for a centrifugal compressor that can enable the surge line for the compressor to selectively be shifted to the left (i.e., surge is delayed to a lower flow rate at a given pressure ratio). One embodiment described herein comprises a turbocharger, comprising:

a turbine housing and a turbine wheel mounted in the turbine housing and connected to a rotatable shaft for rotation therewith, the turbine housing receiving exhaust gas and supplying the exhaust gas to the turbine wheel;

a centrifugal compressor assembly comprising a compressor housing and a compressor wheel mounted in the compressor housing and connected to the rotatable shaft for rotation therewith, the compressor wheel having blades and defining an inducer portion, the compressor housing having an air inlet wall defining an air inlet for leading air generally axially into the compressor wheel, the compressor housing further defining a volute for receiving compressed air discharged generally radially outwardly from the compressor wheel; and a compressor inlet-adjustment mechanism disposed in the air inlet of the compressor housing and movable between an open position and a closed position, the inlet-adjustment mechanism comprising a plurality of first blades lying in a first plane normal to a rotational axis of the turbocharger and a plurality of second blades lying in a second plane parallel and axially adjacent to the first plane, the first and second blades being disposed about the air inlet and each pivotable about one end of the blade, the first and second blades pivoting radially inwardly through a slot in the air inlet wall when the blades are in the closed position so as to form an orifice of reduced diameter relative to a nominal diameter of the inlet, and pivoting radially outwardly through said slot when the blades are in the open position so as to form an orifice corresponding to said nominal diameter.

In one embodiment, the inlet-adjustment mechanism comprises a stand-alone cartridge that includes a pair of annular end plates that are axially spaced apart. The first and second blades are disposed between said end plates, and the cartridge is disposed in an annular space defined by the compressor housing. The annular space can be defined between a main portion of the compressor housing that forms part of the air inlet to the compressor and a separate inlet duct member that forms the remainder of the air inlet. The inlet duct member is received into a receptacle defined in the main portion of the compressor housing.

In accordance with an alternative embodiment, the inlet-adjustment mechanism is a non-cartridge form wherein the function of the first end plate is performed by an integral portion of the compressor housing, and the function of the second end plate is performed by an integral portion of the inlet duct member.

In one embodiment in which the cartridge form is employed, the end plates are spaced apart by a plurality of first pins that pass through holes in the first blades and a plurality of second pins that pass through holes in the second blades, and the first and second blades pivot about said first and second pins, respectively.

The inlet-adjustment mechanism further comprises a unison ring that is rotatable about a rotational axis of the turbocharger. Each of the first and second blades is engaged with the unison ring such that rotation of the unison ring causes the first and second blades to pivot about said first and second pins. Each first and second blade can include an end portion that engages a slot defined in an inner periphery of the unison ring.

The inlet-adjustment mechanism can further comprise a plurality of guides for guiding rotation of the unison ring. The guides can project from one of the end plates when a cartridge form of the mechanism is used, or from a corresponding compressor housing structure in a non-cartridge form. The guides can engage a radially outer periphery of the unison ring.

In one embodiment, each second pin is a stop for an adjacent said first blade to limit radially outward pivoting of said first blade, and each first pin is a stop for an adjacent said second blade to limit radially outward pivoting of said second blade. Each first blade can include a recess in a radially outward edge of the first blade for receiving the second pin of an adjacent said second blade, and each second blade cab include a recess in a radially outward edge of the second blade for receiving the first pin of an adjacent said first blade.

In accordance with one embodiment, a radially inner edge of each first blade defines adjacent first and second edge portions, and the radially inner edge of each second blade defines adjacent third and fourth edge portions. The first edge portions of the first blades have a circular-arc shape and the third edge portions of the second blades have a circular-arc shape the same as that of the first edge portions of the first blades. The second edge portions of the first blades have a circular-arc shape and the fourth edge portions of the second blades have a circular-arc shape the same as that of the second edge portions of the first blades. The first and third edge portions of the first and second blades, respectively, are configured so that in the closed position of the inlet-adjustment mechanism the first and third edge portions collectively form said circular orifice of reduced diameter, and the second and fourth edge portions of the first and second blades, respectively, are configured so that in the open position of the inlet-adjustment mechanism the second and fourth edge portions collectively form said orifice corresponding to the nominal diameter.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 4A is a magnified portion of FIG. 4, to show details of the arrangement of blades;

FIG. 6A is a magnified portion of FIG. 6, to show details of the arrangement of the blades.

DETAILED DESCRIPTION OF THE DRAWINGS

The present inventions now will be described more fully hereinafter with reference to the accompanying drawings, in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

In the present disclosure, the term "orifice" means "opening" without regard to the shape of the opening. Thus, an "orifice" can be circular or non-circular. Additionally, when the blades of the inlet-adjustment mechanism are described as pivoting "radially" inwardly or outwardly, the term "radially" does not preclude some non-radial component of movement of the blades (for example, the blades may occupy a plane that is angled slightly with respect to the rotational axis of the compressor, such that when the blades pivot radially inwardly and outwardly, they also move with a small axial component of motion).

Figure 1:
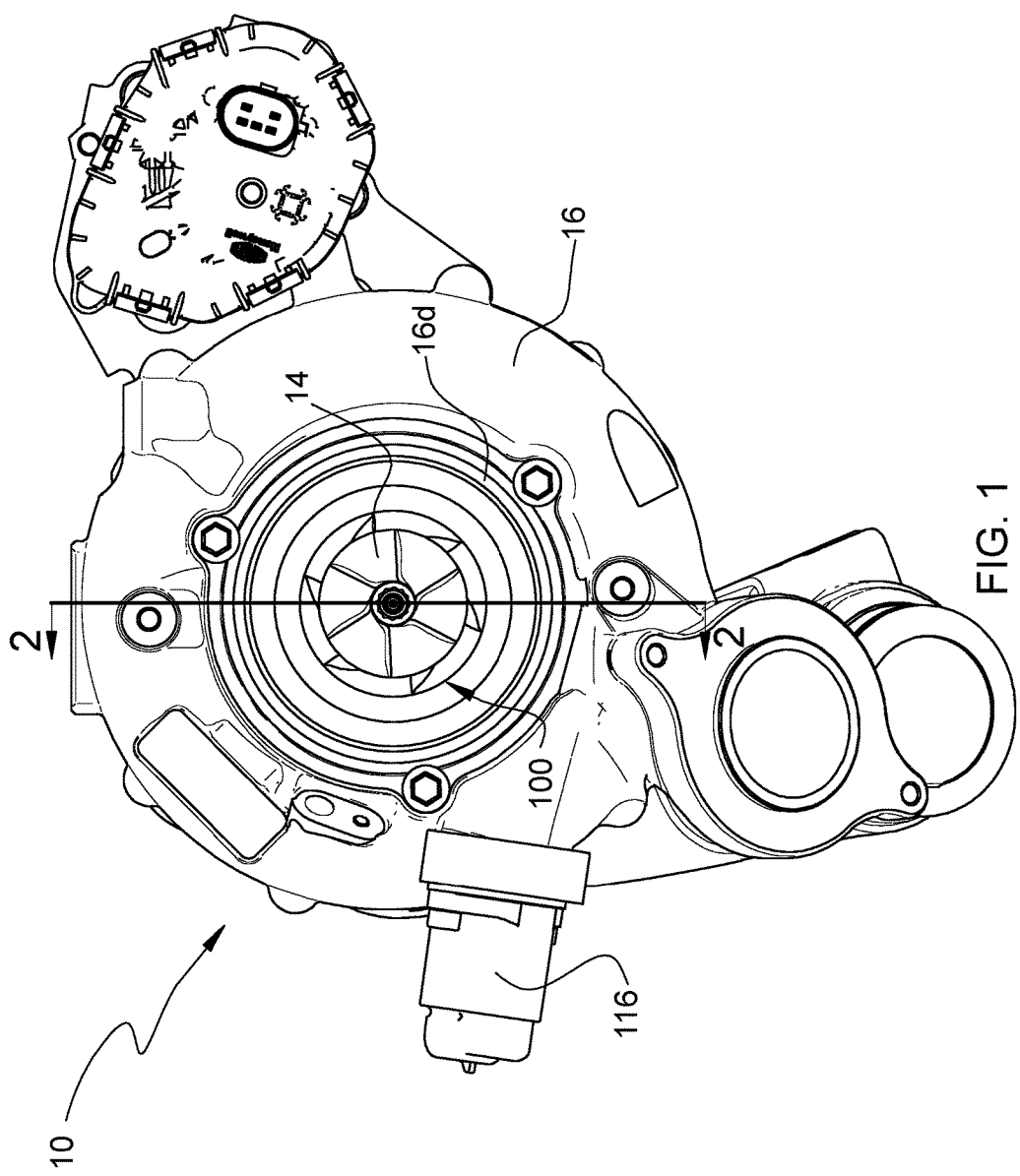
FIG. 1 is an end view of a turbocharger in accordance with one embodiment of the invention, looking axially from the compressor end toward the turbine end of the turbocharger.
Figure 2:
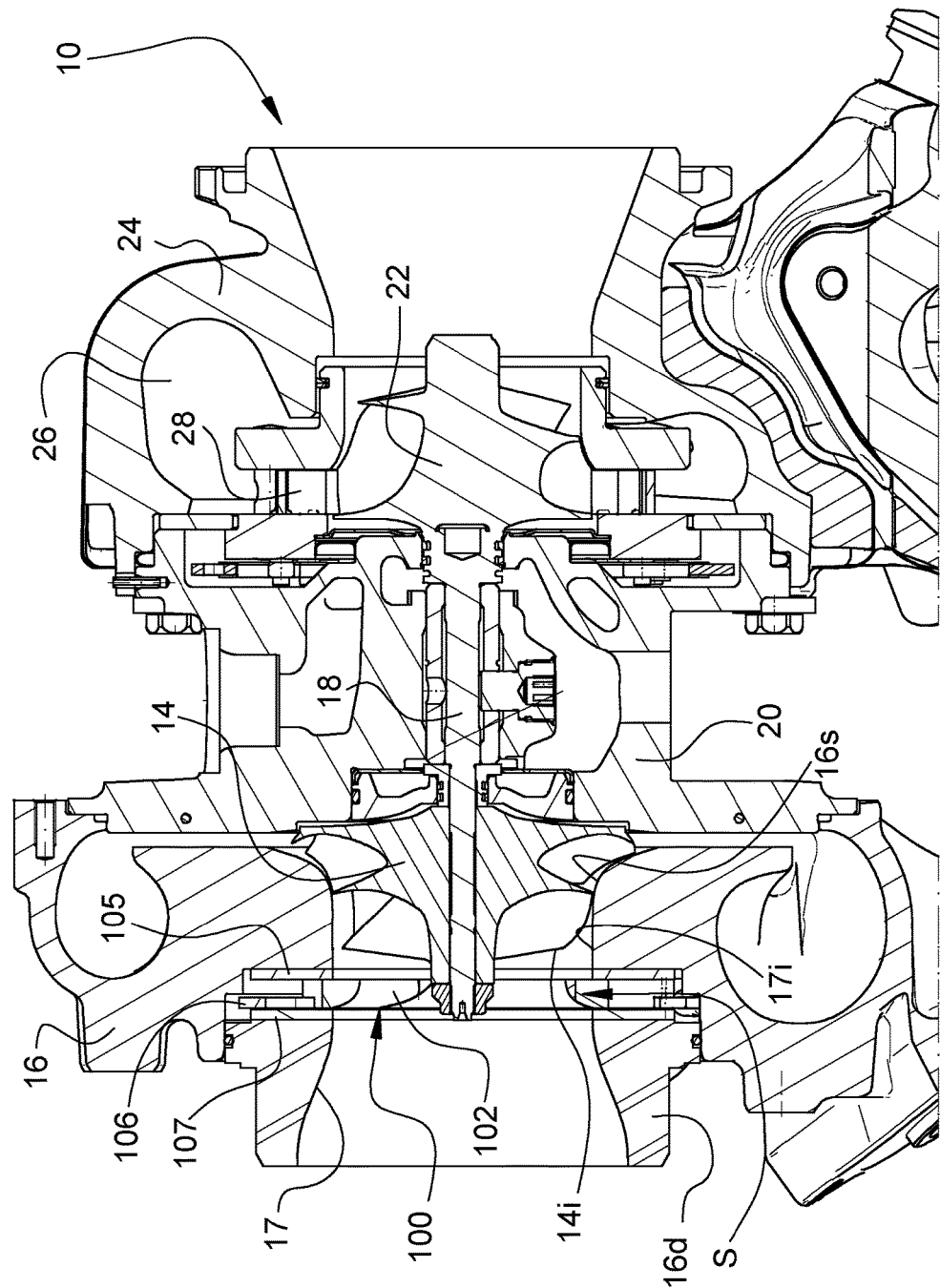
FIG. 2 is a cross-sectional view of the turbocharger along line 2-2 in FIG. 1.

A turbocharger 10 in accordance with one embodiment of the invention is illustrated in axial end view in FIG. 1, and an axial cross-sectional view of the turbocharger is shown in FIG. 2. The turbocharger includes a compressor and a turbine. The compressor comprises a compressor wheel or impeller 14 mounted in a compressor housing 16 on one end of a rotatable shaft 18. The compressor housing includes a wall that defines an air inlet 17 for leading air generally axially into the compressor wheel 14. The shaft is supported in bearings mounted in a center housing 20 of the turbocharger. The shaft is rotated by a turbine wheel 22 mounted on the other end of the shaft from the compressor wheel, thereby rotatably driving the compressor wheel, which compresses air drawn in through the compressor inlet and discharges the compressed air generally radially outwardly from the compressor wheel into a volute 21 for receiving the compressed air. From the volute 21, the air is routed to the intake of an internal combustion engine (not shown) for boosting the performance of the engine.

The turbine wheel 22 is disposed within a turbine housing 24 that defines an annular chamber 26 for receiving exhaust gases from an internal combustion engine (not shown). The turbine housing also defines a nozzle 28 for directing exhaust gases from the chamber 26 generally radially inwardly to the turbine wheel 22. The exhaust gases are expanded as they pass through the turbine wheel, and rotatably drive the turbine wheel, which in turn rotatably drives the compressor wheel 14 as already noted.

Figure 3:
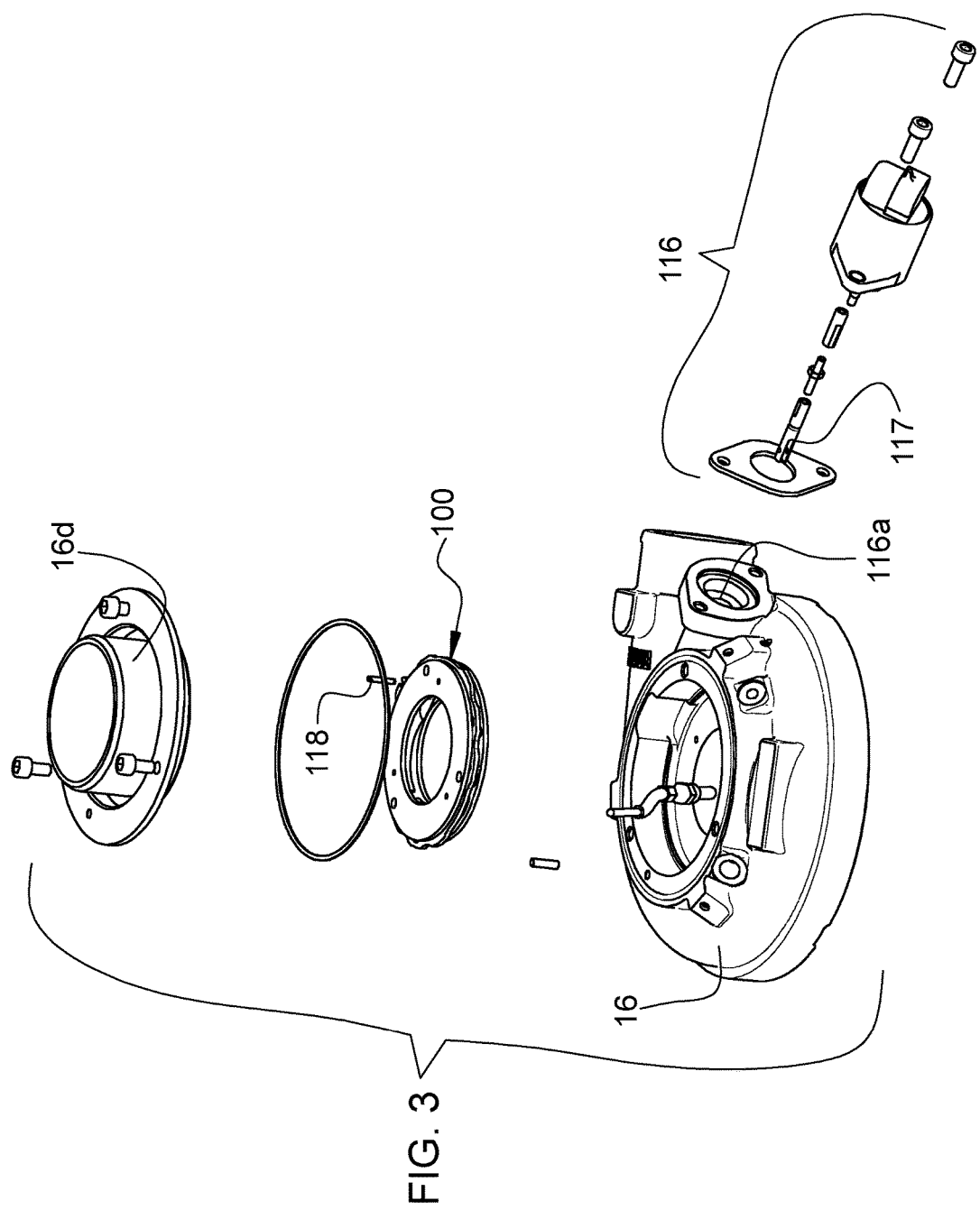
FIG. 3 is an exploded view of the compressor portion of the turbocharger of FIG. 1.

With reference to FIGS. 1-3, in the illustrated embodiment, the wall that defines the air inlet 17 is formed in part by the compressor housing 16 and in part by a separate inlet duct member 16*d* that is received into a cylindrical receptacle defined by the compressor housing. The portion of the air inlet 17 proximate the compressor wheel 14 defines a generally cylindrical inner surface 17*i* that has a diameter generally matched to the diameter of an inducer portion 14*i* of the compressor wheel.

The compressor housing 16 defines a shroud surface 16*s* that is closely adjacent to the radially outer tips of the compressor blades. The shroud surface defines a curved contour that is generally parallel to the contour of the compressor wheel.

In accordance with the invention, the compressor of the turbocharger includes an inlet-adjustment mechanism 100 disposed in the air inlet 17 of the compressor housing. The inlet-adjustment mechanism comprises a ring-shaped assembly and is disposed in an annular space defined between the compressor housing 16 and the separate inlet duct member 16*d*. The inlet-adjustment mechanism is operable for adjusting an effective diameter of the air inlet into the compressor wheel. As such, the inlet-adjustment mechanism is movable between an open position, a closed position, and a super-closed position, and can be arranged to be adjusted to various positions intermediate between said open, closed, and super-closed positions.

With reference now to FIGS. 4, 5A, 5B, and 6, the inlet-adjustment mechanism comprises a plurality of first blades 102A arranged about the central axis of the air inlet and each pivotable about a first pivot pin 104A located at or near one end of the blade, and a plurality of second blades 102B arranged about the central axis and each pivotable about a second pin 104B located at or near one end of the blade. The first blades 102A lie in a first plane, and the second blades 102B lie in a second plane parallel and axially adjacent to the first plane. In the illustrated embodiment, the inlet-adjustment mechanism is a cartridge that comprises an annular first end plate 101, a unison ring 106, and an annular second end plate 107. The pivot pins 104A,B are secured in the first end plate 101 and the first blades 102A are arranged to rest against the end plate, and the second blades 102B lie on top of the first blades. The assembly of the blades 102A,B and unison ring 106 is captively retained between the first end plate 101 and the opposite second end plate 107. The pivot pins 104A,B serve the further function of axially spacing the two end plates apart from each other.

While the illustrated embodiment employs two sets of blades 102A and 102B, more than two sets of blades can be employed in a similar fashion.

A plurality of guides 103 are also secured in the end plate 101, and optionally can be secured in the other end plate 107 instead, or can be secured to both end plates. The guides are located so as to engage the circular inner periphery of the unison ring 106 that surrounds the blades 102A,B. The guides 103 serve to guide the unison ring when it is rotated about its central axis (which coincides with the rotational axis of the turbocharger), so that the unison ring remains substantially concentric with respect to the end plate 101. The guides 103 can comprise rollers or fixed guide pins or protrusions from an end plate. The inner periphery of the unison ring defines a plurality of first slots 108A, equal in number to the number of first blades 102A, and a plurality of second slots 108B equal in number to the number of second blades 102B. Each first blade 102A includes an end portion that engages one of the first slots 108A, so that when the unison ring is rotated about its axis, the first blades are pivoted about the first pivot pins 104A. Similarly, each second blade 102B includes an end portion that engages one of the second slots 108B, so that when the unison ring is rotated about its axis, the second blades are pivoted about the second pivot pins 104B.

As shown in FIG. 2, the entire assembly is disposed in an annular space defined between the compressor housing 16 and the inlet duct member 16*d*. The two end plates 101 and 107 have an inner diameter matched to the diameter of the cylindrical inlet surface 17*i* proximate the inducer 14*i* of the compressor wheel, such that the two end plates are effectively part of the wall defining the air inlet 17, and such that the axial space between the two end plates effectively forms an opening or slot through the wall of the air inlet. The blades 102A,B are arranged to pass through this slot.

As noted, in an alternative embodiment (not shown), the inlet-adjustment mechanism is embodied in a non-cartridge form in which there are no separate end plates 101, 107. Thus, the function of the first end plate 101 can be served by an integral portion of the compressor housing 16, and the function of the second end plate 107 can be served by an integral portion of the inlet duct member 16*d*.

Figure 4:
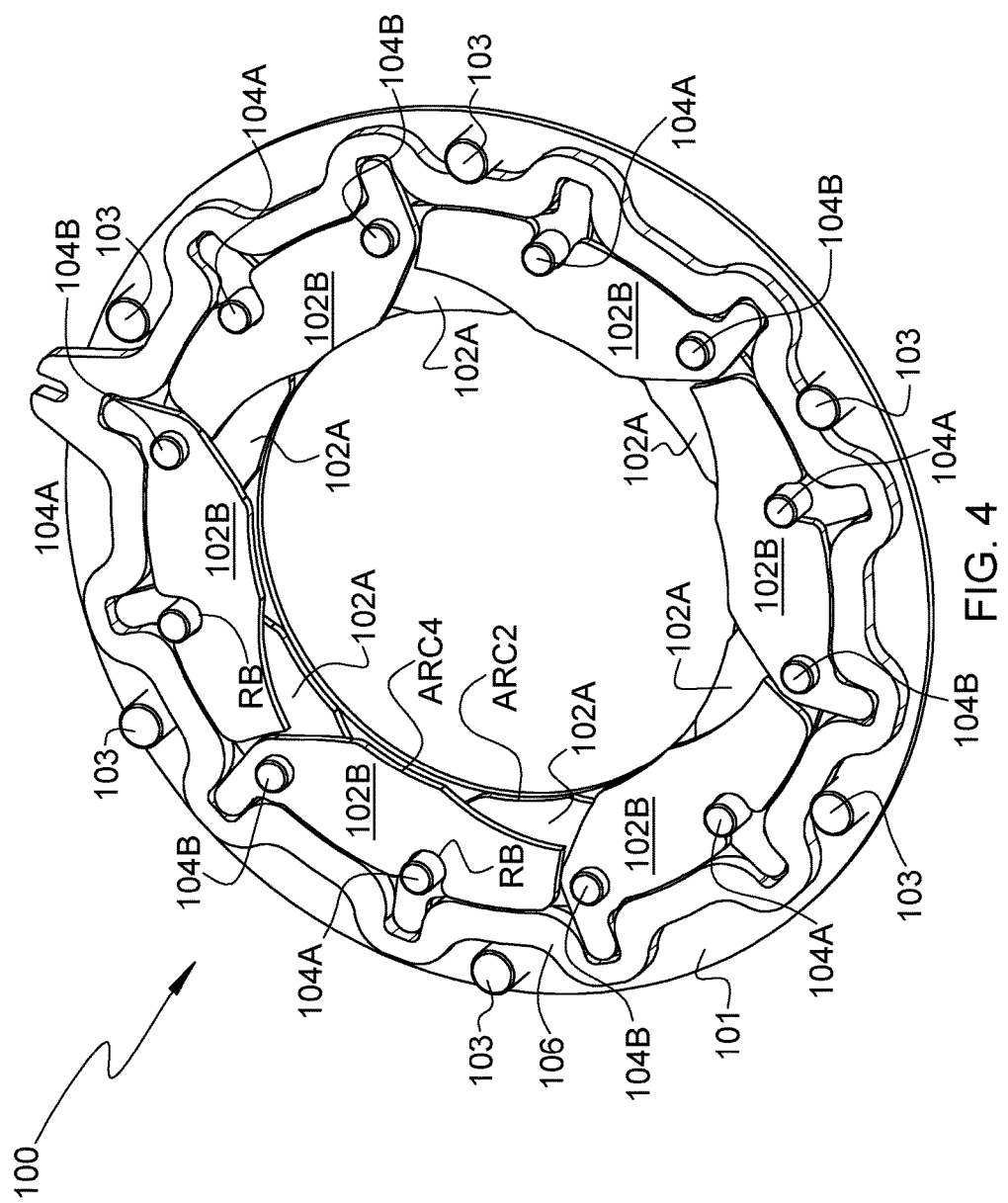
FIG. 4 is a perspective view of an inlet-adjustment mechanism for the compressor, illustrating a fully open position of the inlet-adjustment mechanism, with the top plate of the inlet-adjustment mechanism removed to show details of the blades.

The radially inner edges of the blades 102A,B include portions that preferably are generally circular arc-shaped and these edges collectively surround and bound a generally circular opening. The range of pivotal movement of the blades is sufficient that the blades can be pivoted radially outwardly (by rotation of the unison ring in one direction, clockwise in FIGS. 4 and 6) to an open position as shown in FIG. 4, in which the blades are withdrawn so that they do not project radially inwardly beyond the inner peripheries of the end plates 101, 107. As such, in the open position of the blades, the inlet-adjustment mechanism does not alter the nominal inlet diameter as defined by the inner peripheries of the plates and by the inlet surface 17*i*.

Figure 6:
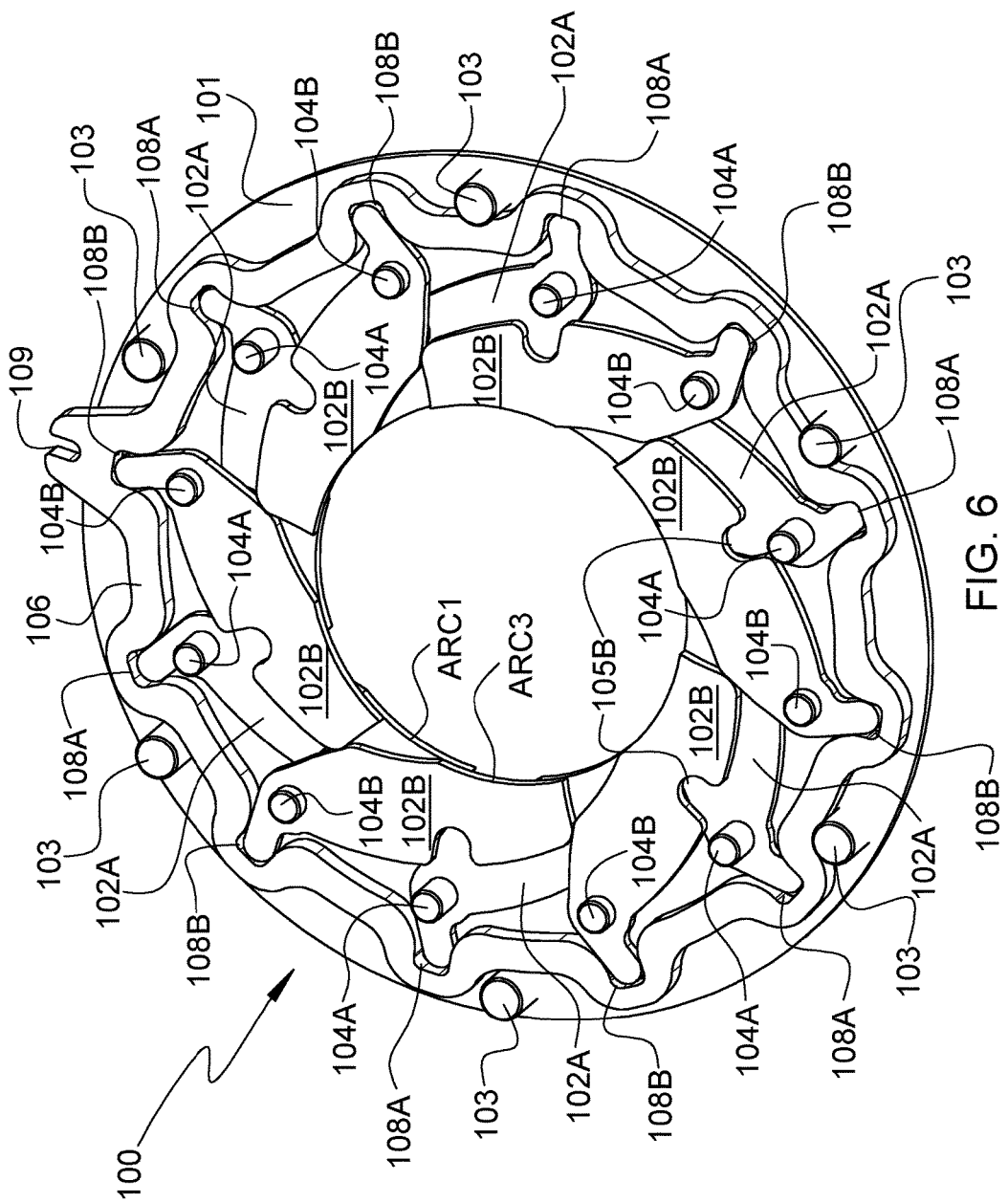
FIG. 6 is a view similar to FIG. 4, showing the inlet-adjustment mechanism in a closed position.

The blades can also be pivoted radially inwardly (by rotation of the unison ring in the opposite direction, counterclockwise in FIGS. 4 and 6) to a closed position as shown in FIG. 6. In the closed position, the circular-arc edges along the radially inner sides of the blades 102A,B collectively form an orifice that is substantially a circle having a diameter that is less than that of the inlet surface 17*i*. ("Substantially a circle" in the present disclosure means that the circular-arc edges all lie on the same circle and collectively occupy at least 80% of the circumference of that circle.) This has the consequence that the effective diameter of the inlet is reduced relative to the nominal inlet diameter. Thus, the inlet-adjustment mechanism causes the effective diameter of the inlet to be further reduced relative effective diameter of the air inlet approaching the compressor wheel.

Figure 5A:
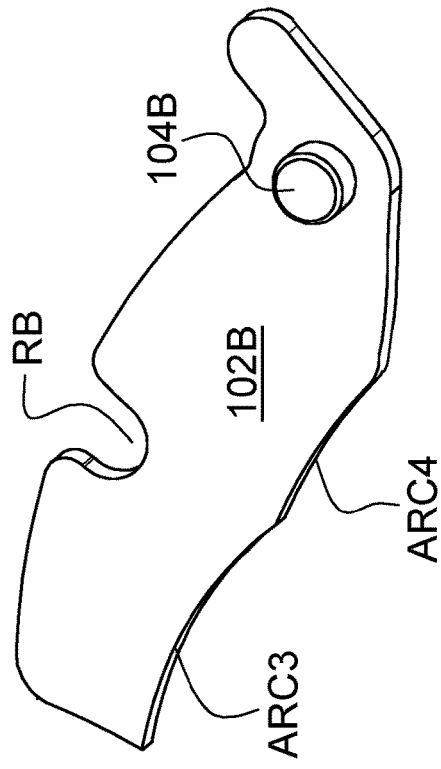
FIG. 5A is a perspective view of a first blade for the inlet-adjustment mechanism.
Figure 5B:
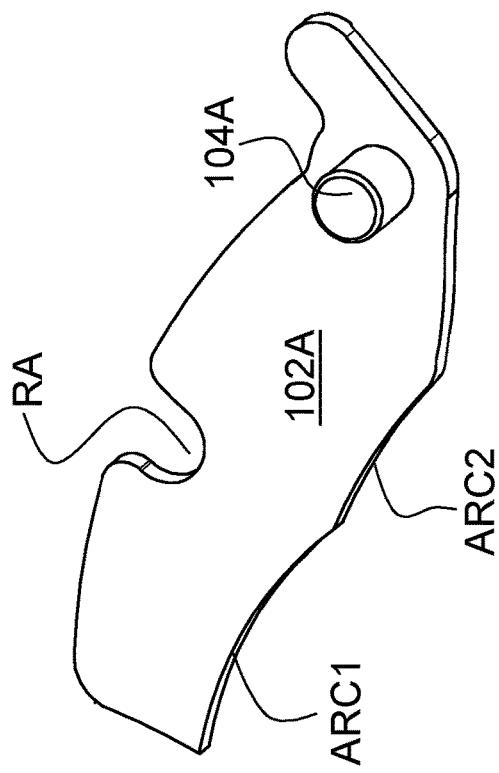
FIG. 5B is a perspective view of a second blade for the inlet-adjustment mechanism.

In accordance with one embodiment as illustrated, and with reference to FIGS. 5A and 5B, a radially inner edge of each first blade 102A defines adjacent first and second edge portions ARC1 and ARC2, respectively, and the radially inner edge of each second blade 102B defines adjacent third and fourth edge portions ARC3 and ARC4, respectively. The first edge portions ARC1 of the first blades 102A preferably have a circular-arc shape and the third edge portions ARC3 of the second blades 102B preferably have a circular-arc shape the same as that of the first edge portions of the first blades. The second edge portions ARC2 of the first blades 102A preferably have a circular-arc shape and the fourth edge portions ARC4 of the second blades 102B preferably have a circular-arc shape the same as that of the second edge portions of the first blades.

Advantageously, the first and third edge portions ARC1 and ARC3 of the first and second blades, respectively, are configured so that in the closed position of the inlet-adjustment mechanism the first and third edge portions collectively form a circular orifice of reduced diameter as shown in FIG. 6. Similarly, the second and fourth edge portions ARC2 and ARC4 of the first and second blades, respectively, are configured so that in the open position of the inlet-adjustment mechanism the second and fourth edge portions collectively form an orifice corresponding to the nominal diameter as shown in FIG. 4.

With further reference to FIGS. 4 and 5A and 5B, the first pins 104A can form stops for the second blades 102B to delimit the farthest-open position of the second blades, and similarly the second pins 104B can form stops for the first blades 102A. In the illustrated embodiment, each first blade 102A includes a recess RA in a radially outward edge of the first blade for receiving the second pin of an adjacent said second blade 102B, and each second blade 102B includes a recess RB in a radially outward edge of the second blade for receiving the first pin of an adjacent said first blade 102A.

With reference to FIGS. 4A and 6A, it is advantageous but not essential for the blades of each set (i.e., the first blades 102A as one set, and the second blades 102B as another set) to be configured such that the clearance CL between the end of one blade and the end or portion of the adjacent blade to be as small as practicable through the whole range of movement of the blades between the open and closed positions. Thus, FIG. 4A shows the clearance CL in the open position and FIG. 6A shows the clearance in the closed position. FIGS. 4A and 6A show this feature for the second blades 10B, but it is to be understood that the same minimal clearance can be employed for the first blades 102A. Minimizing the clearance in this manner minimized air leakage past the blade arrangement, so that substantially all of the air is constrained to pass through the orifice delimited by the inner edges of the blades.

As previously described, the blades 102A,B are actuated to pivot between their open and closed positions by the unison ring 106 that is rotatable about the center axis of the air inlet. Referring now to FIG. 3, rotational motion is imparted to the unison ring by an actuator 116 that is received into a receptacle 116a defined in the compressor housing. The actuator includes an actuator rod 117 that extends through a space defined in the compressor housing and is affixed at its distal end to a pin 118 that engages a slot 109 in the outer periphery of the unison ring 106. The actuator is operable to extend and retract the rod 117 linearly along its length direction so as to rotate the unison ring 106 and thereby actuate the blades 102. Extending the rod pivots the blades towards the closed position and retracting the rod pivots the blades toward the open position.

As noted, the inlet-adjustment mechanism 100 enables adjustment of the effective size or diameter of the inlet into the compressor wheel 14. As illustrated in FIG. 6, when the inlet-adjustment mechanism is in the closed position, the effective diameter of the inlet into the compressor wheel is dictated by the inside diameter defined by the blades 102A, B. In order for this effect to be achieved, the axial spacing distance between the blades and the compressor wheel must be as small as practicable, so that there is insufficient distance downstream of the blades for the flow to expand to the full diameter of the inducer portion of the compressor wheel 14 by the time the air encounters it. The inlet diameter is thereby effectively reduced to a value that is dictated by the blades.

At low flow rates (e.g., low engine speeds), the inlet-adjustment mechanism 100 can be placed in the closed position of FIG. 6. This can have the effect of reducing the effective inlet diameter and thus of increasing the flow velocity into the compressor wheel. The result will be a reduction in compressor blade incidence angles, effectively stabilizing the flow (i.e., making blade stall and compressor surge less likely). In other words, the surge line of the compressor will be moved to lower flow rates (to the left on a map of compressor pressure ratio versus flow rate).

At intermediate and high flow rates, the inlet-adjustment mechanism 100 can be partially opened or fully opened as in FIG. 4. This can have the effect of increasing the effective inlet diameter so that the compressor regains its high-flow performance and choke flow essentially as if the inlet-adjustment mechanism were not present and as if the compressor had a conventional inlet matched to the wheel diameter at the inducer portion of the wheel.

Many modifications and other embodiments of the inventions set forth herein will come to mind to one skilled in the art to which these inventions pertain having the benefit of the teachings presented in the foregoing descriptions and the associated drawings. For example, although the illustrated embodiment employs six first blades 102A and six second blades 102B, the invention is not limited to any particular number of blades. Similarly, as already noted, the invention is not limited to two sets of blades in two parallel planes; the same concept can be implemented with, for example, three sets of blades in three parallel planes. Additionally, in the illustrated embodiment, the inlet-adjustment mechanism 100 is formed as a stand-alone cartridge, but alternatively, as noted, a non-cartridge embodiment of the invention is also within the scope of the invention. Furthermore, while the illustrated embodiment employs blades having circular-arc-shaped edges for forming a circular orifice in certain positions of the mechanism, the present invention encompasses non-circular orifices as well, and blades having edges shaped other than as circular arcs can be used in the practice of the invention. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A turbocharger, comprising:
   a turbine housing and a turbine wheel mounted in the turbine housing and connected to a rotatable shaft for rotation therewith, the turbine housing receiving exhaust gas and supplying the exhaust gas to the turbine wheel;
   a centrifugal compressor assembly comprising a compressor housing and a compressor wheel mounted in the compressor housing and connected to the rotatable shaft for rotation therewith, the compressor wheel having blades and defining an inducer portion, the compressor housing having an air inlet wall defining an air inlet for leading air generally axially into the compressor wheel, the compressor housing further defining a volute for receiving compressed air discharged generally radially outwardly from the compressor wheel; and
   a compressor inlet-adjustment mechanism disposed in the air inlet of the compressor housing and movable between an open position and a closed position, the inlet-adjustment mechanism comprising a plurality of first blades lying in a first plane normal to a rotational axis of the turbocharger and a plurality of second blades lying in a second plane parallel and axially adjacent to the first plane, the first and second blades being disposed about the air inlet and each pivotable about one end of the blade, the first and second blades pivoting radially inwardly through a slot in the air inlet wall when the blades are in the closed position so as to form an orifice of reduced diameter relative to a nominal diameter of the air inlet, and pivoting radially outwardly through said slot when the blades are in the open position so as to form an orifice corresponding to said nominal diameter.

2. The turbocharger of claim 1, wherein the inlet-adjustment mechanism further comprises a pair of annular end plates that are axially spaced apart and wherein the first and second blades are disposed between said end plates, the inlet-adjustment mechanism being disposed in an annular space defined by the compressor housing.

3. The turbocharger of claim 2, wherein the end plates are spaced apart by a plurality of first pins that pass through holes in the first blades and a plurality of second pins that pass through holes in the second blades, and the first and second blades pivot about said first and second pins, respectively.

4. The turbocharger of claim 1, wherein the inlet-adjustment mechanism further comprises a unison ring that is rotatable about a rotational axis of the turbocharger, wherein each of the first and second blades is engaged with the unison ring such that rotation of the unison ring causes the first and second blades to pivot about said first and second pins.

5. The turbocharger of claim 4, wherein each first and second blade includes an end portion that engages a slot defined in an inner periphery of the unison ring.

6. The turbocharger of claim 4, wherein the inlet-adjustment mechanism further comprises a plurality of guides for guiding rotation of the unison ring.

7. The turbocharger of claim 1, wherein each first blade of the plurality of first blades pivots about a first pin and each second blade of the plurality of second blades pivots about a second pin, wherein said second pin is a stop for an adjacent first blade of the plurality of first blades to limit radially outward pivoting of said adjacent first blade of the plurality of first blades, and said first pin is a stop for an adjacent second blade of the plurality of second blades to limit radially outward pivoting of said adjacent second blade of the plurality of second blades.

8. The turbocharger of claim 7, wherein each first blade of the plurality of first blades includes a recess in a radially outward edge of each first blade for receiving a second pin of a plurality of second pins adjacent each second blade of the plurality of second blades, and each second blade of the plurality of second blades includes a recess in a radially outward edge of each second blade for receiving a first pin of a plurality of first pins adjacent each first blade.

9. The turbocharger of claim 1, wherein a radially inner edge of each first blade of the plurality of first blades defines adjacent first and second edge portions, and the radially inner edge of each second blade of the plurality of second blades defines adjacent third and fourth edge portions, the first edge portions of the first blades having a circular-arc shape and the third edge portions of the second blades having a circular-arc shape the same as that of the first edge portions of the first blades, the second edge portions of the first blades having a circular-arc shape and the fourth edge portions of the second blades having a circular-arc shape the same as that of the second edge portions of the first blades, wherein the first and third edge portions of the first and second blades, respectively, are configured so that in the closed position of the inlet-adjustment mechanism the first and third edge portions collectively form said orifice of reduced diameter, and wherein the second and fourth edge portions of the first and second blades, respectively, are configured so that in the open position of the inlet-adjustment mechanism the second and fourth edge portions collectively form said orifice corresponding to the nominal diameter.

* * * * *